July 26, 1955 J. SCHREUR ET AL 2,714,158
RADIO RECEIVER CIRCUIT WITH REFLEX MEANS
Filed July 30, 1951
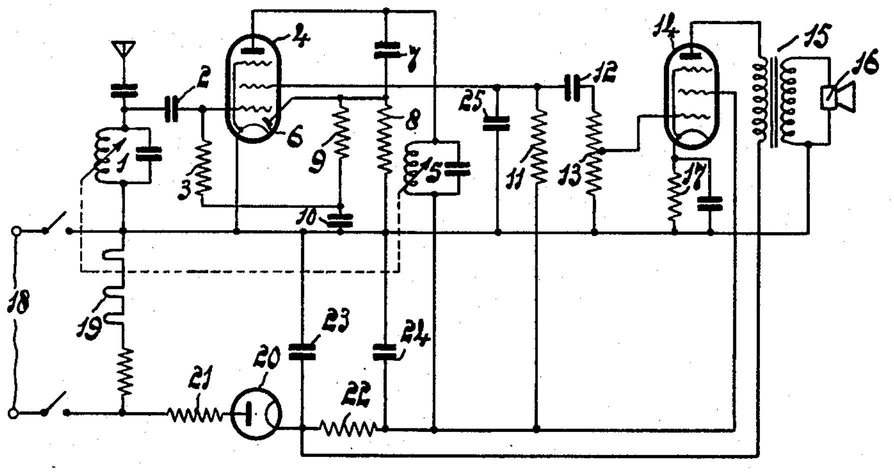
INVENTORS
Jan Schreur
Johan Hendrik Van Wageningen
By Fred M Vogel
AGENT 2,714,158
Patented July 26, 1955

2,714,158

RADIO RECEIVER CIRCUIT WITH REFLEX MEANS

Jan Schreur and Johan Hendrik van Wageningen, Eindhoven, Netherlands, assignors to Hartford National Bank and Trust Company, Hartford, Conn., as trustee Application July 30, 1951, Serial No. 239,205
Claims priority, application Netherlands August 10, 1950
3 Claims. (Cl. 250—20)

This invention relates to wireless receiver circuit-arrangements, particularly for direct reception, that is to say, without frequency transformation of the oscillations received, comprising a high frequency-amplifier valve, which also serves the purpose of amplifying the low-frequency oscillations, the control-grid circuit and the anode circuit in which the high-frequency oscillations are set up including each a circuit tuned to the low-frequency oscillations and the low-frequency oscillations obtained by detection of the high-frequency oscillations set up across the second tuned circuit being fed to the control grid of the valve via a resistor.

Receiver circuits of this kind, so-called reflex-circuits, are known. The function of reflex-circuits is generally to reduce the number of amplifier valves. This has a limitation in that the circuit becomes comparatively involved, since particular measures are required to avoid unwanted couplings between the various circuits, so that the operation may become unstable. However, circuits of the above mentioned kind which are otherwise stable, have the particular disadvantage that due to the capacitative couplings (for example via the anode-control grid capacity) and the resistor coupling between the two circuits the selectivity and the sensitivity are comparatively low and in addition the resonance curve is asymmetric, which leads to distortion of the low frequency signal. Endeavours have been made to mitigate the first mentioned disadvantages by using a feedback for the high frequency oscillations but this feedback naturally renders the circuit more involved and operation more difficult since a supplementary element is required to adjust the degree of feedback. The reduction in cost obtained by economizing in amplifier valves is thus largely affected since other compound members which are also comparatively costly are required to be included in the circuit.

The invention provides a combination of measures which permits the number of supplementary component members of a reflex receiver to be greatly reduced while ensuring at the same time highly satisfactory selectivity and sensitivity. It is now realised that with many known reflex-receivers, the failing selectivity and the distortion are mainly due to the fact that the path through which the low-frequency oscillations are fed to the input-circuit of the valve either comprises a great number of supplementary circuit elements or brings about such a coupling between the high-frequency circuits that the resonance curve becomes wider and the sensitivity is decreased. Due to the available resistor coupling in conjunction with the capacitative coupling between the circuits by way of the internal tube capacities and the wiring capacities the resonance curve is in addition asymmetric and the distortion referred to hereinbefore occurs.

The invention consists in that in a circuit as described in the opening part, the resistor by way of which the low-frequency oscillations are fed back from the detector circuit to the input circuit of the tube and which constitutes a direct resistor coupling between these circuits comprises two parts directly connected in series, the junction point between which is connected, via a capacitor which has a low impedance for the high-frequency oscillations to be amplified, to a point of constant voltage. The low-frequency voltage is preferably taken from an impedance in the screen grid lead. The latter impedance is, for example, the screen grid resistor, which is provided as it is.

Apart from the fact that the desired decoupling of the circuits can be ensured more readily, an important advance of this circuit on that in which the low-frequency signal is obtained from a resistor in the anode circuit of the reflex tube, is that the resistor in the screen-grid circuit can be much heavier than that in the anode circuit and that the impedance of the triode formed by the grid and the screen grid of the tube is low and that of the pentode part is very high. This results in a higher hum-voltage (originating from the supply-voltage which has not been perfectly smoothed) across the anode than across the screen grid. If therefore the low-frequency signal is absorbed from the screen grid, a lower hum-voltage is set up at the grid of the end tube than in many other circuit arrangements. The use of the screen grid for the said purpose is also favourable in view of other voltage-variations in the high-voltage lead which may give rise to definite unwanted phenomena, inter alia so-called "motor-boating." The low-frequency amplification obtained is highly satisfactory so that it is possible to achieve adequate amplification with the use of a single reflex-stage and a low-frequency amplifier.

The said resistor as is known per se, is preferably connected directly between the detector circuit and the control grid of the tube so that not only a low frequency voltage but also a direct voltage varying with the carrier wave amplitude are set up at the said grid. This also avoids overload of the tube. If the detected signal becomes intenser and the low-frequency voltage across the detector is thus increased, the negative grid-voltage of the tube is automatically increased. A signal intense enough for the tube to be overloaded is thus prevented from being set up at the grid of the tube.

The so-called remainder-signal, that is to say the signal that may be set up by detection across the high-frequency part of the circuit, is not a source of trouble in the circuit arrangement according to the invention if volume control by hand is effected not as usual in the detector circuit but in the screen-grid circuit, for which purpose the series combination of a fixed condenser and a potentiometer is connected in parallel with the screen grid resistor.

In this circuit arrangement, it is favourable for the detector anode, which is connected by way of a capacitor to the high-frequency output circuit of the tube, to be connected directly across a resistor to a point of constant potential and in addition, across the said resistor consisting of two parts, to the control grid of the tube. The variations of the direct voltage component thus set up across the control grid have the effect of counteracting the formation of a grid current at increasing amplitude of the high-frequency voltage. In addition, the use of a tube having a non-linear characteristic curve thus permits of obtaining automatic control of the amplitude of the low-frequency voltage and of avoiding the low-frequency distortion which occurs with many reflex-circuits.

It has been found that in some cases the use of the reflex principle with directly acting receivers is difficult to realise in practice without comparatively involved auxiliary means, if the circuits are tuned capacitively, that is to say with the use of the conventional variable capacitors. This has been found to be due again to the fact that there is also provided between the circuits a capacitative coupling by way of the internal tube capacities and the wiring capacities, said coupling varying to a comparatively marked extent with the tuning in the case of capacitative tuning.

According to a further feature of the invention, use is therefore made in addition of inductive tuning, that is to say tuning by means of variation of the inductances of the circuits. This measure assists considerably in the decoupling mentioned hereinbefore and hence in the effective operation of the circuit arrangement described and without the use of particular auxiliary means it is possible to achieve amplification free from distortion. This is due to the fact that in the case of inductive tuning the capacitative coupling between the circuits does not vary with the tuning, in contra-distinction to the case of capacitative tuning, and neutro-dyning throughout the tuning range can be achieved in a simple manner. This neutro-dyning may consist in providing a certain fixed stray coupling between the coils of the circuits. In many devices working with inductive tuning this does not require any particular measures, since in definite embodiments thereof the screening boxes of the coils are already provided with an aperture for leading through the drive for the slidable coil cores. It has been found that the inductive coupling thus produced is sufficiently constant to eliminate the capacitative stray coupling so long as the coils are wound in the correct manner in relation to one another.

In order that the invention may be readily carried into effect, an example will now be described in detail with reference to the accompanying drawing, which is a schematic circuit diagram.

The circuit-arrangement shown is intended for receivers required to be adapted to be connected to an alternating current equally well as to a direct current mains. The oscillations collected by the antenna are fed to an input circuit 1 the inductance of which comprises, for example, a slidable core of ferro-magnetic material so that the circuit can be tuned to the desired receiving frequency by moving the core. The end of the circuit 1 which is connected to the antenna is connected to a capacitor 2 and to the control grid of an amplifier valve 4 in which the detector anode 6 is also housed. Apart from the said electrodes and the cathode, the tube contains a screening grid, a suppressor grid connected to the cathode and an anode.

The anode is connected via an input circuit 5 to the positive terminal of a supply source. The circuit 5 is also tuned inductively to the frequencies required to be received, the tuning elements of the circuits 1 and 5 being mechanically coupled together in the usual manner. The anode of the tube 4 is furthermore connected via a capacitor 7 to the detector anode 6 so that the detected low-frequency oscillations are set up across a resistor 8 connected between the said anode and the cathode.

Thus, the detector anode and the grid of the tube 4 have arranged between them the series combination of two resistors 3 and 9 the common point of which is connected by way of a capacitor 10 to the point of constant voltage. Direct supply of the low-frequency voltage to the grid has the advantage that with devices adapted to be supplied with direct current equally well as with alternating current and with which the chassis is consequently often at a voltage there is less probability of hum than when, as is usual with superheterodyne devices, the low frequency voltage is supplied to an impedance connected between the chassis and the input circuit. The resistor 3 is only of little influence on the quality of the input circuit, since with a direct receiver, the latter is a high-frequency circuit.

If the capacitor 10 is not provided, the circuit-arrangement is by no means unstable but there is between the circuits 1 and 5 a coupling across the capacitor 7, the resistors 9 and 3 and the capacitor 2. This combined capacitative and ohmic coupling may even give rise to a kind of overcritically coupled band-pass filter, which in the case of equal tuning of each of the circuits has moreover an asymmetric characteristic curve so that the selectivity is low and in addition distortions are set up. This coupling is eliminated by the capacitor 10 which has a low impedance for the high-frequency oscillations. The capacity of this capacitor may be about 100 pf. at a value of 1 megohm of each of the resistors 3 and 9. A suitable value for the capacitor 7 is 12 pf.

The second grid of the tube 4 is connected via a resistor 11 of about 60,000 ohms to a positive terminal of the supply source and acts as an anode for the low-frequency oscillations, the capacitor 25 forming a path of low impedance for the high-frequency oscillations. The low-frequency oscillations are then fed via a capacitor 12 to a potentiometer 13 the sliding contact of which is connected to the control grid of the low-frequency amplifier valve 14, which is also a pentode. The anode circuit of a tube 14 includes the primary of an output transformer 15, the secondary of which is connected to a loudspeaker 16. The mains are connected to terminals 18. The circuit arrangement comprises in addition a rectifier 20 for the mains voltage, resistors 21 and 22 and smoothing capacitors 23 and 24. The series-connected cathodes of the tubes are shown again at 19.

The correct bias voltage for the control grid of tube 14 is obtained by the use of the parallel combination 17 of a resistor and a capacitor in the cathode lead. It has been found that in the circuit arrangement described there is no need for any particular measures to adjust the bias voltage of the control grid of the tube 4 to the most suitable value but that in the case of connecting the resistor 9 to the detector anode correct adjustment is obtained.

What we claim is:

1. A receiver for an incoming high-frequency wave modulated by a low-frequency signal comprising a reflex amplifying stage including an electron discharge tube having a cathode, a control grid, a screen grid and an anode, a first high-frequency resonant circuit coupled between the control grid and cathode of said tube, a second high-frequency resonant circuit coupled between the anode and cathode of said tube, said resonant circuits each including an inductance and permeability tuning means therefor, means ganging said tuning means for simultaneous adjustment, means to detect the high-frequency oscillations set up across said second circuit to derive the low-frequency signal therefrom, first and second serially-connected resistors, means to supply said detected signal through said resistors to said control grid, a capacitor connecting the junction of said resistors to the cathode of said tube, and means to derive the amplified low-frequency signal from said screen grid.

2. A receiver for an incoming high-frequency wave modulated by a low-frequency signal comprising a reflex amplifying stage including an electron discharge tube having a cathode, a control grid, a screen grid, an anode and an auxiliary anode forming in conjunction with said cathode a diode section, a first high-frequency resonant circuit coupled between the control grid and cathode of said tube, a second high-frequency resonant circuit coupled between the anode and cathode of said tube, said resonant circuits each including an inductance and permeability tuning means therefor, means ganging said tuning means for simultaneous adjustment means including said diode section to detect the high-frequency oscillations set up across said second circuit to derive the low-frequency signal therefrom, first and second resistors connected in series between said auxiliary anode and said control grid, a capacitor connecting the junction of said resistors to the cathode of said tube, and means to derive the amplified low-frequency signal from said screen grid.

3. A receiver, as set forth in claim 2, wherein said detection means includes a capacitance coupling said anode to said auxiliary anode to apply the amplified high-frequency wave thereto.

(References on following page)

References Cited in the file of this patent

UNITED STATES PATENTS

| | | |
|---|---|---|
| 2,058,512 | Rust et al. | Oct. 27, 1936 |
| 2,205,243 | Dome | June 18, 1940 |
| 2,582,100 | Broos | Jan. 8, 1952 |

FOREIGN PATENTS

| | | |
|---|---|---|
| 155,091 | Germany | Nov. 25, 1938 |
| 410,858 | Italy | June 13, 1945 |
| 588,479 | Great Britain | May 22, 1947 |
| 645,849 | Great Britain | Nov. 8, 1950 |